(12) United States Patent
Ihm et al.

(10) Patent No.: US 9,338,774 B2
(45) Date of Patent: May 10, 2016

(54) METHOD AND APPARATUS FOR USER EQUIPMENT SEARCHING CONTROL CHANNEL IN WIRELESS COMMUNICATION SYSTEM

(71) Applicant: LG ELECTRONICS INC., Seoul (KR)

(72) Inventors: Bin Chul Ihm, Anyang-si (KR); Ki Tae Kim, Anyang-si (KR); Su Nam Kim, Anyang-si (KR); Ji Won Kang, Anyang-si (KR); Jin Young Chun, Anyang-si (KR); Sung Ho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/355,196

(22) PCT Filed: Nov. 5, 2012

(86) PCT No.: PCT/KR2012/009220
§ 371 (c)(1),
(2) Date: Apr. 29, 2014

(87) PCT Pub. No.: WO2013/066122
PCT Pub. Date: May 10, 2013

(65) Prior Publication Data
US 2014/0348093 A1    Nov. 27, 2014

Related U.S. Application Data

(60) Provisional application No. 61/555,482, filed on Nov. 4, 2011.

(51) Int. Cl.
*H04W 4/00* (2009.01)
*H04W 72/04* (2009.01)
*H04W 72/00* (2009.01)
*H04L 5/00* (2006.01)

(52) U.S. Cl.
CPC ......... *H04W 72/042* (2013.01); *H04L 5/0048* (2013.01); *H04L 5/0051* (2013.01); *H04L 5/0053* (2013.01); *H04L 5/0094* (2013.01); *H04W 72/00* (2013.01); *H04L 5/001* (2013.01)

(58) Field of Classification Search
None
See application file for complete search history.

(56) References Cited

U.S. PATENT DOCUMENTS

2011/0292891 A1\* 12/2011 Hsieh .................. H04L 5/001
                                                     370/329
2012/0009923 A1\* 1/2012 Chen .................. H04L 5/0091
                                                     455/434

FOREIGN PATENT DOCUMENTS

| KR | 1020100113040 A | 4/2009 |
|---|---|---|
| KR | 1020100011879 A | 2/2010 |
| KR | 1020110085878 A | 7/2011 |
| KR | 1020110086523 A | 7/2011 |
| WO | 2011037439 A2 | 3/2011 |

\* cited by examiner

*Primary Examiner* — Chi H Pham
*Assistant Examiner* — Fahmida Chowdhury
(74) *Attorney, Agent, or Firm* — Lee, Hong, Degerman, Kang & Waimey; Jonathan Kang; Richard Salfelder

(57) ABSTRACT

Disclosed is a method and apparatus for searching for a user equipment searching for a control channel in a multi-node system. The method comprises: searching inside an E-PDCCH region for a first piece of downlink control information (DCI), which is determined according to a transmission mode; and searching inside the E-PDCCH region for a second piece of DCI, regardless of the transmission mode, wherein the E-PDCCH region is a control channel region to which the DCI, which is decoded on the basis of a user equipment-specific reference signal (URS), is transmitted from a subframe comprising a plurality of orthogonal frequency division multiplexing (OFDM) symbols.

8 Claims, 14 Drawing Sheets

METHOD AND APPARATUS FOR USER EQUIPMENT SEARCHING CONTROL CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2012/009220, filed on Nov. 5, 2012, which claims the benefit of U.S. Provisional Application Ser. No. 61/555,482, filed on Nov. 4, 2011, the contents of which are all hereby incorporated by reference herein in their entirety.

BACKGROUND OF THE INVENTION

1. Field of the Invention

The present invention relates to wireless communication and, more particularly, to a method and apparatus for searching for a control channel by a user equipment (UE) in a wireless communication system.

2. Related Art

Recently, an amount of data transfer of a wireless communication network has rapidly increased. The increase in the amount of data transfer attributes to machine-to-machine (M2M) communication and the advent and prevalence of various devices such as smartphones, tablet PCs, and the like, requiring a large amount of data transfer. In order to meet the required large amount of data transfer, recently, carrier aggregation aimed at effective use of more frequency bands, cognitive radio technology, and multi-antenna technology and multi-base station cooperation technology aimed at increasing data capacity within a limited frequency, and the like, have emerged.

A wireless communication network has evolved toward increasing density of accessible nodes around users. Here, nodes may refer to antennas or antenna groups spaced apart from a distributed antenna system by a predetermined interval or greater, or without being limited thereto, but nodes may be used in a broader context. Namely, nodes may be a pico-cell base station (PeNB), a home base station (HeNB), a remote radio head (RRH), a remote radio unit (RRU), a repeater, and the like. A wireless communication system having high density of nodes may exhibit higher system performance through node cooperation. Namely, compared to a case in which nodes separately operate as a base station (BS), an advanced BS (ABS), a node-B (NB), an eNode-B (eNB), an access point (AP), or the like, without cooperation, if nodes operate like antennas or antenna groups with respect to a single cell under administration of a single control station in their transmission and reception, far better system performance may be attained. Hereinafter, a wireless communication system including a plurality of nodes will be referred to as a multi-node system.

Nodes generally refer to an antenna group spaced apart by more than a predetermined interval from a distributed antenna system (DAS). But nodes may also be defined as a certain antenna group regardless of a distance to the DAS. For example, a base station including cross polarized antennas may be considered as a base station including a node configured as an H-pol antenna and a node configured as a V-pol antenna, and the present invention may be applied thereto.

Meanwhile, in a multi-node system, a new control channel may be used due to an inter-cell interference and shortage of capacity in existing control channels. Existing control channels may be decoded based on a cell-specific reference signal (CRS), while the new control channel may be decoded based on a user-specific reference signal. Hereinafter, a new control channel will be referred to as an enhanced-PDCCH (E-PDCCH). Among a control region to which an existing PDCCH is allocated and a data region to which a data channel is allocated, the E-PDCCH may be allocated to the data region.

Two different resource allocation schemes such as non-interleaving and interleaving may be applied to the E-PDCCH region to which the E-PDCCH is allocated.

Meanwhile, in the multi-node system employing the E-PDCCH, a UE may be set to search for downlink control information (DCI) from only the E-PDCCH region. DCIs may include DCI with respect to a transmission (which is called a fallback mode transmission) to be performed just in case a UE fails to receive required control information or the control information is not reliable.

In which scheme a UE set to search for DCI from the E-PDCCH is to search for DCI for the fallback mode transmission is problematic.

SUMMARY OF THE INVENTION

An aspect of the present invention provides a method for searching for a control channel by a user equipment (UE) in a wireless communication system and a UE using the same.

According to an aspect of the present invention, there is provided a method for searching for a control channel by a user equipment (UE) in a multi-node system, including: searching for first downlink control information (DCI) determined according to a transmission mode in an enhanced-physical downlink control channel (E-PDCCH); and searching for second DCI in the E-PDCCH regardless of the transmission mode, wherein the E-PDCCH region is a control channel region in which DCI decoded based on a UE-specific REFERENCE SIGNAL (URS) in a subframe including a plurality of orthogonal frequency division multiplexing) symbols is transmitted.

According to another aspect of the present invention, there is provided a user equipment (UE) searching for a control channel in a multi-node system, including: a radio frequency (RF) unit configured to transmit and receive a wireless signal; and a processor connected to the RF unit, wherein the processor searches for first downlink control information (DCI) determined according to a transmission mode in an enhanced-physical downlink control channel (E-PDCCH), and searches for second DCI in the E-PDCCH regardless of the transmission mode, wherein the E-PDCCH region is a control channel region in which DCI decoded based on a UE-specific REFERENCE SIGNAL (URS) in a subframe including a plurality of orthogonal frequency division multiplexing) symbols is transmitted.

According to embodiments of the present invention, a common search space (CSS) and a UE-specific search space (USS) may be configured in an E-PDCCH region. A UE may be set to search for downlink control information within the E-PDCCH region. The UE may stably detect downlink control information for a fallback mode during a process of changing a serving node, so it may be stably served.

DESCRIPTION OF EXEMPLARY EMBODIMENTS

A user equipment (UE) may be fixed or mobile, and may be called by other names such as mobile station (MS), mobile terminal (MT), user terminal (UT), subscriber station (SS), wireless device, personal digital assistant (PDA), wireless modem, handheld device, or the like.

A base station (BS) generally refers to a fixed station communicating with a UE and may be called by other names such as evolved-NodeB (eNB), base transceiver system (BTS), access point (AP), or the like.

Hereinafter, the present invention applied based on $3^{rd}$ generation partnership project (3GPP) long term evolution (LTE) based on 3GPP technical specification (TS) release 8 or 3GPP LTE-A based on 3GPP TS release 10 will be described. However, this is merely illustrative and the present invention may be applied to various wireless communication networks.

In order to enhance performance of a wireless communication system, technology is advancing toward increasing density of accessible nodes around users. In a wireless communication system having high density of nodes, cooperation between nodes may enhance performance of the system. A wireless communication system including nodes connected to and controlled by a base station (BS) in a wired manner or wirelessly will be referred to as a multi-node system.

Figure 1:
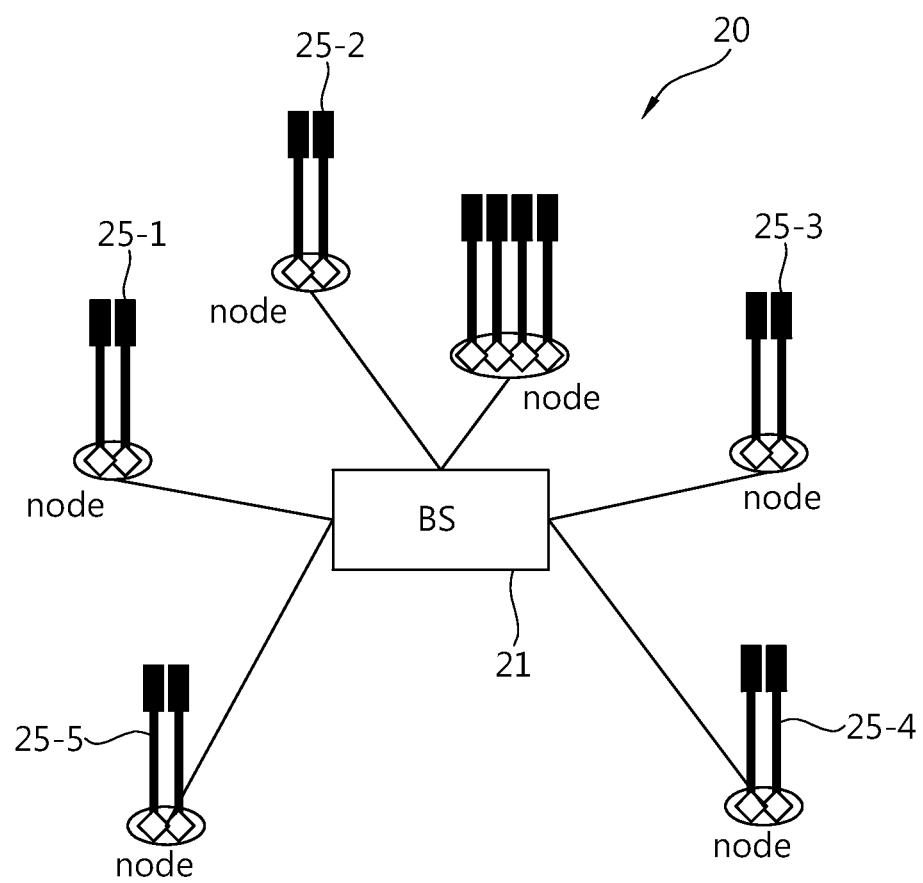
FIG. 1 is a view illustrating an example of a multi-node system.

FIG. 1 illustrates an example of a multi-node system.

Referring to FIG. 1, a multi-node system 20 may be composed of a single BS 21 and a plurality of nodes 25-1, 25-2, 25-3, 25-4, and 25-5. The plurality of nodes 25-1, 25-2, 25-3, 25-4, and 25-5 may be managed by the single BS 21. Namely, the plurality of nodes 25-1, 25-2, 25-3, 25-4, and 25-5 operate like a portion of a single cell. Each node may use the same cell ID, without a separate node ID, and may operate like a partial antenna group within a cell. In this case, the multi-node system 20 of FIG. 1 may be considered as a distributed multi-node system (DMNS) forming a single cell.

Also, the plurality of nodes 25-1, 25-2, 25-3, 25-4, and 25-5 may have a separate cell ID and perform scheduling and handover (HO) of a UE. In this case, the multi-node system 20 of FIG. 1 may be considered as a multi-cell system. The BS 21 may be a macro cell, and each node may be a femto cell or a pico cell having coverage smaller than that of a macro cell. When a plurality of cells are overlaid according to coverage, it may be called a multi-tier network.

In FIG. 1, each of the nodes 25-1, 25-2, 25-3, 25-4, and 25-5 may be any one of a BS, a node B, an eNode-B, a pico cell eNb (PeNB), a home eNB (HeNB), a radio remote head (RRH), a relay station (RS) or repeater, and a distributed antenna. At least one antenna may be installed in a node. Also, a node may be called a point. In the present disclosure, a node refers to an antenna group spaced apart from a DMNS by a predetermined interval. Namely, in the present disclosure, it is assumed that each node refers to an RRH physically. However, the present invention is not limited thereto and a node may be defined as a certain antenna group regardless of a physical interval. For example, it may be assumed that a BS including a plurality of cross-polarized antennas includes a node including horizontally polarized antennas and a node including vertically polarized antennas, and the present invention may be applied. Also, the present invention may also be applied to a case in which each node is a pico cell or a femto cell having cell coverage smaller than that of a macro cell, namely, to a multi-cell system. In the following description, an antenna may be replaced with an antenna port, a virtual antenna, an antenna group, or the like, as well as a physical antenna.

Figure 2:
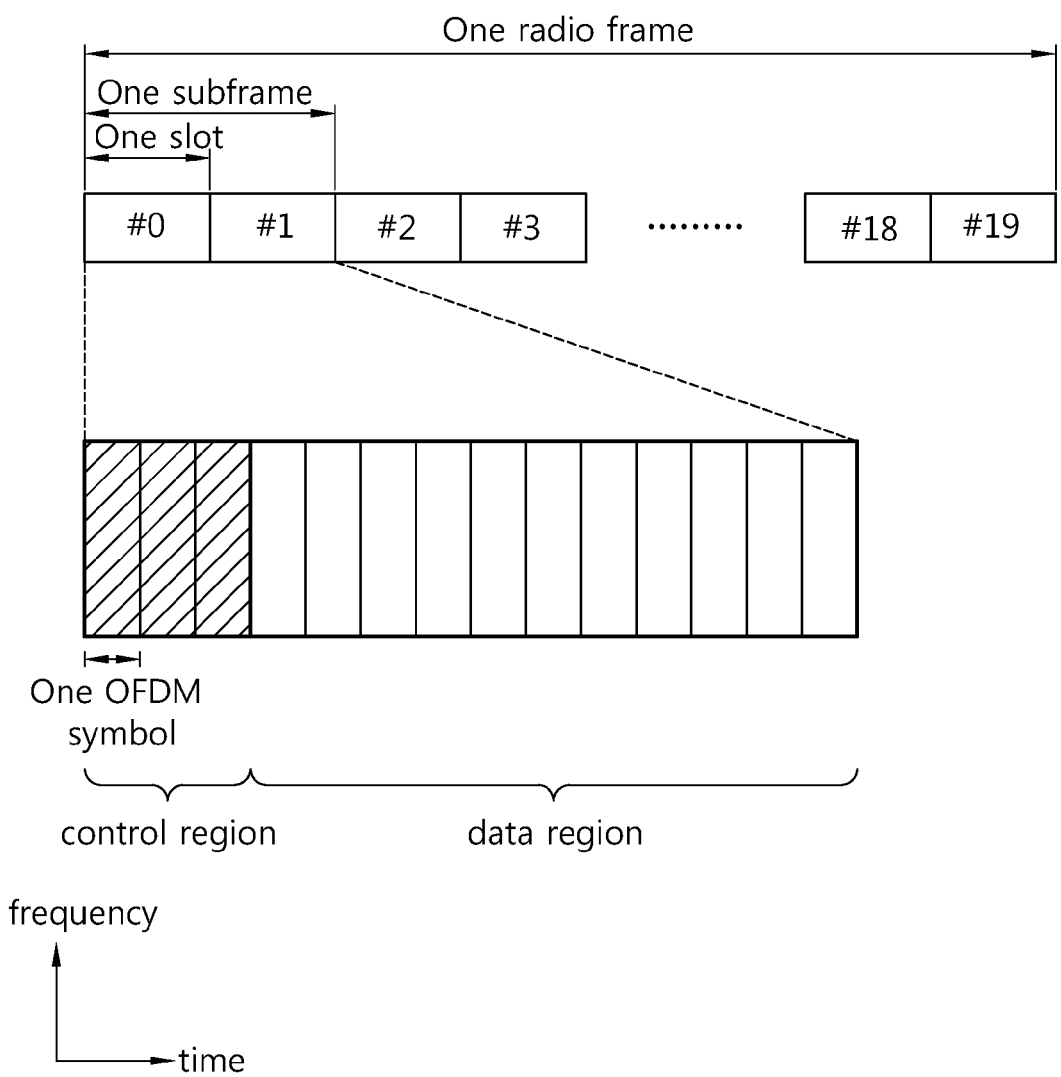
FIG. 2 is a view illustrating a structure of a downlink radio frame in 3GPP LTE-A.

FIG. 2 is a view illustrating a structure of a downlink radio frame in 3GPP LTE-A. It may refer to section 6 of 3GPP TS 36.211 V10.2.0 (2011-06) "Evolved Universal Terrestrial Radio Access (E-UTRA); Physical Channels and Modulation (Release 10)".

A radio frame includes ten subframes indexed by 0 to 9. A single frame includes two contiguous slots. A time take for a single subframe to be transmitted is a transmission time interface (TTI). A single subframe has a length of 1 ms, and a single slot has a length of 0.5 ms, for example.

A single slot may include a plurality of orthogonal frequency division multiplexing (OFDM) symbols in a time domain. An OFDM symbol is merely used to express a single symbol period in a time domain because 3GPP LTE uses an orthogonal frequency division multiple access (OFDMA) in downlink DL, so a multi-access scheme or a name thereof is not limited. For example, an OFDM symbol may be called by other name such as a single carrier-frequency division multiple access (SC-FDMA) symbol, a symbol period, or the like.

Figure 3:
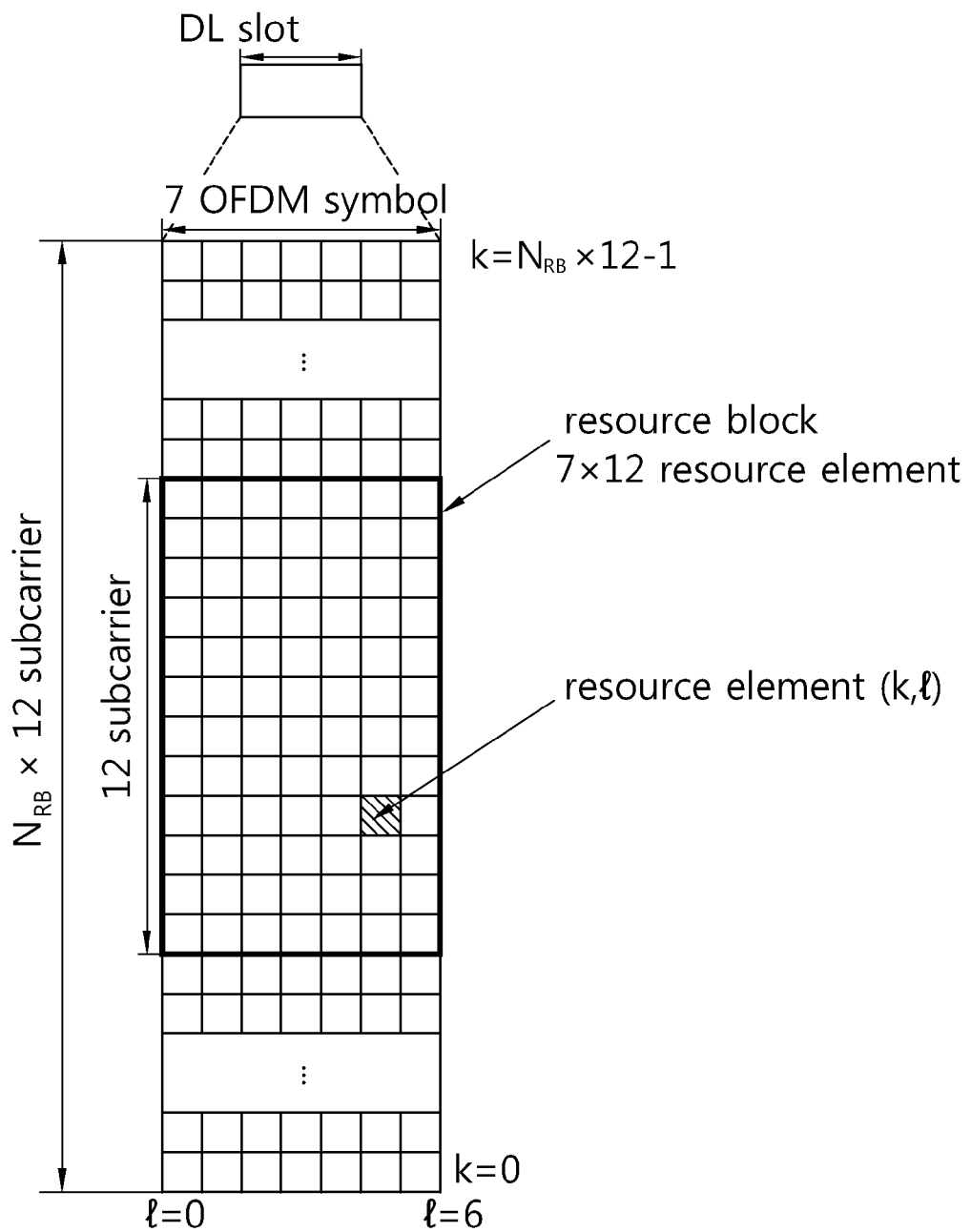
FIG. 3 is a view illustrating an example of a resource grid with respect to a single downlink slot.

FIG. 3 is a view illustrating an example of a resource grid with respect to a single downlink slot.

A downlink slot includes a plurality of OFDM symbols in a time domain and $N_{RB}$ number of resource blocks in a frequency domain. The $N_{RB}$ number of resource blocks included in the downlink slot is dependent upon a downlink transmission bandwidth set in a cell. For example, in an LTE system, $N_{RB}$ may be any one of 6 to 110. A single resource block includes a plurality of subcarriers in the frequency domain. A structure of an uplink slot may be identical to that of the downlink slot.

Each element of a resource grid is called a resource element. The resource elements of the resource grid can be identified by a pair of indices (k,l) in the slot. Here, k (k= 0, . . . , $N_R \times 12-1$) is a subcarrier index in the frequency domain, and l (l=0, . . . , 6) is an OFDM symbol index in the time domain.

Here, it is illustrated that one resource block includes 7×12 resource elements composed of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on a length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in a single OFDM symbol.

A downlink (DL) subframe used in downlink is divided into a control region and a data region in the time domain. The control region includes a maximum of four OFDM symbols before a first slot in a subframe, but the number of OFDM symbol included in the control region may vary. A physical downlink control channel (PDCCH) and other control channels are allocated to the control region, and a PDSCH is allocated to the data region.

As presented in 3GPP TS 36.211 V10.2.0, in 3GPP LTE/LTE-A, physical channels may be divided into physical downlink shared channel (PDSCH) and a physical uplink shared channel (PUSCH) as data channels, and physical downlink control channel (PDCCH), a physical control format indicator channel (PCFICH), a physical hybrid-ARQ indicator channel (PHICH), and a physical uplink control channel (PUCCH) as control channels.

The PCFICH transmitted in a first OFDM symbol of a subframe carries a control format indicator (CFI) regarding the number (namely, a size of a control region) of OFDM symbols used to transmit control channels. A UE first receives the CFI on a PCFICH and subsequently monitors a PDCCH. Unlike the PDCCH, a PCFICH is transmitted through fixed PCFICH resource of a subframe, without using blind decoding.

The PHICH carries an ACK (positive-acknowledgement)/NACK (negative-acknowledgement) signal for an uplink hybrid automatic repeat request (HARQ). An ACK/NACK signal with respect to UL data on a PUSCH transmitted by a UE is transmitted on the PHICH.

A physical broadcast channel (PBCH) is transmitted in first four OFDM symbols of a second slot of a first subframe of a radio frame. The PBCH carries system information essential for the UE to communicate with a BS, and system information transmitted through the PBCH is called a master information block (MIB). In comparison therewith, system information transmitted on a PDSCH indicated by a PDCCH is called a system information block (SIB).

Control information transmitted through the PDCCH is called downlink control information (DCI). The DCI includes resource allocation of the PDSCH (it is also called a downlink (DL) grant), resource allocation of the PUSCH (it is also called uplink (UL) grant), an aggregation of transmission power control command with respect to individual UEs of a certain UE group and/or activation of voice over Internet protocol (VoIP). Various formats of DCI may exist. For example, DCI formats may include 0, 1, 1A/1B/1C/1D, 2, 2A/2B/2C, 3, 3A, 4, and the like.

Among DCI format, the DCI format 1A is used for compact scheduling of a single PDSCH codeword or a random access process.

The following information is transmitted in the DCI format 1A. 1) a flag for distinguishing between DCI format 0 and DCI format 1A, 2) localization/decentralization VRB designation flag, 3) resource block designation, 4) modulation and coding scheme, 5) HARQ process number, 6) new data indicator, 7) redundancy version, 8) TCP command for PUCCH, 9) download designating index (only for TDD), and the like. In a case in which a number of information bits of the DCI format 1A is smaller than that of information bits of the DCI format 0, bits having a value '0' are added to make it equal to a payload size of the DCI format 0. In the DCI format 1A, when the number of information bits is equal to any one of {12, 14, 16, 20, 24, 26, 32, 40, 44, 56}, a bit having a single value '0' is added to the DCI format 1A. With respect to DCI formats, Paragraph 5.3.3.1 of 3GPP TS. 36. 212. V10.3.0 (2011-09) may be referred.

Meanwhile, the DCI format 1A may be used for a fallback mode. The fallback mode refers to a preparation mode for providing a minimum data service in a situation in which control information required for a UE is damaged or has low reliability.

For example, the 3GPP LTE-A provides nine downlink transmission modes as follows. Transmission mode 1: single antenna port, port 0, transmission mode 2: transmit diversity, transmission mode 3: open loop spatial multiplexing: it is an open loop mode available for rank adaptation based on RI feedback. When a rank is 1, transmit diversity may be applied. When a rank is greater than 1, a large delay CDD may be used. Transmission mode 4: closed loop spatial multiplexing or transmit diversity, transmission mode 5: transmit diversity or multi-user MIMO, transmission mode 6: transmit diversity or closed-loop spatial multiplexing having a single transmission layer, transmission mode 7: when a number of PBCH antenna ports is 1, a single antenna port (port 0) is used, or otherwise, transmit diversity is used or single antenna transmission (port 5). Transmission mode 8: when a number of PBCH antenna ports is 1, a single antenna port (port 0) is used, or otherwise, transmit diversity, dual-layer transmission using antenna ports 7 and 8, or single-antenna port transmission using port 7 or port 8. Transmission mode 9: maximum 8 layer transmission (ports 7 to 14).

When a UE monitors a PDCCH based on a C-RNTI, DCI formats to be monitored according to downlink transmission modes and search spaces are determined as shown in Table 1 below.

TABLE 1

| Downlink transmission mode | DCI format | Search space |
| --- | --- | --- |
| Mode 1 | DCI format 1A | Common and UE-specific |
| | DIC format 1 | UE-specific |
| Mode 2 | DCI format 1A | Common and UE-specific |
| | DIC format 1 | UE-specific |
| Mode 3 | DCI format 1A | Common and UE-specific |
| | DIC format 2A | UE-specific |
| Mode 4 | DCI format 1A | Common and UE-specific |
| | DIC format 2 | UE-specific |
| Mode 5 | DCI format 1A | Common and UE-specific |
| | DIC format 1D | UE-specific |
| Mode 6 | DCI format 1A | Common and UE-specific |
| | DIC format 1B | UE-specific |
| Mode 7 | DCI format 1A | Common and UE-specific |
| | DIC format 1 | UE-specific |
| Mode 8 | DCI format 1A | Common and UE-specific |
| | DIC format 2B | UE-specific |
| Mode 9 | DCI format 1A | Common and UE-specific |
| | DIC format 2C | UE-specific |

As illustrated in Table 1, the DCI format 1A is supported for the fallback mode in all of the downlink transmission modes, and the DCI format 1A are searched in a common search space and a UE-specific search space. The search spaces will be described hereinafter.

Meanwhile, the PDCCH is transmitted in OFDM symbols before a PDSCH start OFDM symbol. Namely, in a single subframe, the PDCCH and the PDSCH are time-division-multiplexed.

A BS determines a PDCCH format according to DCI to be transmitted to a UE, adds a CRC to the DCI, and subsequently masks a unique identifier (it is called a radio network temporary identifier (RNTI)) according to an owner or a purpose of the PDCCH to the CRC. Namely, an RNTI is masked to the CRC according to an owner or a purpose of the PDCCH. If the PDCCH is for a specific UE, a unique RNTI of the UE, for example, cell-RNTI (C-RNTI), may be masked to the CRC. If the PDCCH is for a paging message, a paging indication identifier, namely, a paging-RNTI (P-RNTI) may be masked to the CRC. If the PDCCH is for system information block (SIB), system information identifier, namely, system information (SI)-RNTI may be masked to the CRC. In order to indicate an random access response as a response with respect to transmission of a random access preamble of a UE, a random access (RA)-RNTI may be masked to the CRC. If the PDCCH is related to a transmission power control command of a PUSCH, a TCP-PUSCH-RNTI may be masked to the CRC, while if the PDCCH is related to a transmission power control command of a PUCCH, a TCP-PUCCH-RNTI may be masked to the CRC.

A process of processing a physical layer of the PDCCH includes 1) generating bits for the PDCCH, 2) performing scrambling on the bits by a scrambling sequence, 3) performing QPSK modulation on the scrambled bits, 4) layer-mapping and precoding QPSK-modulated symbols, and 5) mapping to resource elements.

<PDCCH Format>

A control region of a DL subframe includes a plurality of control channel elements (CCEs). A CCE is a logical allocation unit used to provide a coding rate according to a state of a radio channel to a PDCCH and corresponds to a plurality of resource element groups (REGs). A single REG includes four Res, and a single CCE includes nine REGs. In order to constitute a single PDCCH, $\{1, 2, 4, 8\}$ number of CCEs may be used, and here, each of $\{1, 2, 4, 8\}$ elements is called a CCE aggregation level. A format of a PDCCH and an available number of bits of the PDCCH is determined according to correlation between a number of CCEs and a coding rate provided by the CCEs.

PDCCH formats are as follows.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Meanwhile, in 3GP LTE, in order to detect a PDCCH, blind decoding (or blind detection) is used. Blind decoding is a method of demasking a desired identifier in a CRC of a received PDCCH (which is called a candidate PDCCH) and checking a CRC error to determine whether the corresponding PDCCH is a control channel thereof or not.

In 3GPP LTE, in order to reduce burden due to blinding decoding, a search space is used. The search space may be a monitoring set of a CCD for a PDCCH. A UE monitors a PDCCH within a corresponding search space.

The search space is divided into a common search space (CSS) and a UE-specific search space (USS). The CSS, a space in which a PDCCH having common control information is searched, is composed of sixteen CCEs from CCE indices 0 to 15 and supports a PDCCH having CCE aggregation levels of $\{4, 8\}$. However, a PDCCH (DCI format 0, 1A) carrying UE-specific information may also be transmitted in the CCS. The USS supports a CCE aggregation level of $\{1, 2, 4, 8\}$.

Table 3 shows the number of PDCCH candidates monitored by a UE.

TABLE 3

| Search Space Type | Aggregation level L | Size [In CCEs] | Number of PDCCH candidates | DCI formats |
| --- | --- | --- | --- | --- |
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

Sizes of search spaces are determined as shown in Table 2, and start points of the common search space (CSS) and the UE-specific search space (USS) are defined to be different. A start point of the CSS is fixed regardless of a subframe, while a start point of the USS may vary for subframes according to a UE identifier (for example, C-RNTI), a CCE aggregation level, and/or a slot number of a radio frame. In a case in which a start point of a USS is within the CSS, the USS and the CSS may overlap.

In detail, in an aggregation level L∈{1,2,3,4}, a search space $S^{(L)}_k$ is defined as an aggregation of PDCCH candidates. A CCE corresponding to a PDCCH candidate m of the search space $S^{(L)}_k$ is given as follows.

$$L \cdot \{(Y_k + m') \bmod \lfloor N_{CCE,k}/L \rfloor\} + i \quad \text{[Equation 1]}$$

Here, $i=0, 1, \ldots, L-1$, $m=0, \ldots, M^{(L)}-1$, and $N_{CCE,k}$ is a total number of CCEs available to be used for transmission of a PDCCH within a control region of a subframe k. The control region includes an aggregation of CCEs numbered from 0 to $N_{CCE,k}-1$. $M^{(L)}$ is a number of PDCCH candidates in a CCE aggregation level L in the given search space.

Meanwhile, the multi-node system may be a carrier aggregation system in which a plurality of serving cells are set up. A single serving cell may be configured only with downlink component carriers (DL CCs) or may be configured as a pair of DL CC and uplink component carrier (UL CC).

Also, a serving cell may be divided in to a primary cell and a secondary cell. The primary cell refers to a serving cell that may be used for a UE to initially access or reaccess a network and that is set up or re-set up for an RRC connection with a BS. The primary cell is defined by a pair of a DL CC and a UL CC. A PUCCH is transmitted through the primary cell. The secondary cell is a serving cell set up for a UE in addition to the primary cell.

In a carrier aggregation system in which a plurality of serving cells are supported, cross-carrier scheduling and non-cross carrier scheduling may be supported.

The cross-carrier scheduling is a scheduling method for allocating resource of PDSCH transmitted through a different component carrier through a PDCCH transmitted through a specific component carrier and/or resource of PUSCH transmitted through a different component carrier other than a component carrier basically linked to the specific component carrier. Namely, the PDCCH and the PDSCH may be transmitted through different DL CCs, and the PUSCH may be transmitted through a UL CC other than a UL CC basically linked to the DL CC through which the PDCCH including UL grant is transmitted.

The non-cross carrier scheduling is a scheduling method for allocating resource of PDSCH of the same component carrier through a PDCCH transmitted through a specific component carrier and allocating resource of PUSCH transmitted through a single component carrier linked to the specific component carrier.

In a system supporting the cross-carrier scheduling, a carrier indicator indicating through which DL CC/UL CC a PDSCH or a PUSCH to which the PDCCH provides control information is transmitted. A field including such a carrier indicator will be referred to as a carrier indication field (CIF) hereinafter. A BS may inform a UE about whether a CIF is included in DCI through a higher layer signal such as an RRC message to thus inform the UE whether cross-carrier scheduling is configured.

When the CIF is set for a UE, in Equation 1, $m'=m+M^{(L)}n_{cif}$, wherein $n_{cif}$ is a value of CIF. When a CIF is not set for a UE, in Equation 1, $m'=m$. In the common search space, $Y_k$ is set to 0 with respect to two aggregation levels L=1 and L=8. In a UE-specific search space of the aggregation level L, the variable $Y_k$ is defined as follows.

$$Y_k = (A \cdot Y_{k-1}) \bmod D \quad \text{[Equation 2]}$$

Here, $Y_{-1}=n_{RNTI}\neq 0$, A=39827, D=65537, k=floor($n_s/2$), and $n_s$ is a slot number of a radio frame.

A UE monitors a single common search space with the aggregation levels {4,8} in a primary cell. A UE for which a CIF is not set monitors a USS with aggregation levels {1, 2, 4, 8} in each activated serving cell. A UE for which a CIF is set monitors one or more USS with each of the aggregation levels {1, 2, 4, 8} in one or more activated serving cells. In the primary cell, a CSS and a USS may overlap.

Meanwhile, various reference signals RSs are transmitted in a subframe. A cell-specific reference signal (CRS) may be received by every UE within a cell and may be transmitted in the entire downlink band. The CRS may be generated based on a cell ID. A UE-specific reference signal (URS) is transmitted in a subframe. While the CRS is transmitted in the entire region of a subframe, the URS is transmitted in a data region of a subframe and used to demodulate a corresponding PDSCH. The URS is also called a demodulation RS (DM-RS). The URS will be described.

With respect to antenna port 5, a URS sequence $r_{ns}(m)$ is defined as expressed by Equation 3.

$$r_{n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 12N_{RB}^{PDSCH} - 1$$

[Equation 3]

In Equation 3, $N^{PDSCH}_{RB}$ is a resource block unit indicating a frequency band of transmission of corresponding PDSCH.

A pseudo-random sequence c(i) is defined by a gold sequence having a length 31 as follows.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 4]}$$

The pseudo-random sequence is initiated to $c_{init}=(\lfloor n_s/2 \rfloor + 1) \cdot (2N_{ID}^{cell}+1) \cdot 2^{16} + n_{RNTI}$ in the beginning of each subframe. Here, $n_{RNTI}$ is a radio network temporary identifier.

Meanwhile, when an antenna port p is {7, 8, ..., v+6}, a URS sequence r(m) may be defined as expressed by Equation 5.

[Equation 5]

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence is initialized to $c_{init}=(\lfloor n_s/2 \rfloor + 1) \cdot (2N_{ID}^{cell}+1) \cdot 2^{16} \cdot n_{SCID}$ in the beginning of each subframe. $n_{SCID}$ is given in the latest DCI format 2B or 2C related to PDSCH transmission with respect to antenna ports 7 and 8 as shown in Table 4.

TABLE 4

| Scrambling identity field in DCI format 2B or 2C | $n_{SCID}$ |
|---|---|
| 0 | 0 |
| 1 | 1 |

Without the DCI format 2B or 2C related to PDSCH transmission of antenna port 7 or 8, a UE assumes that $n_{SCID}$ is 0. With respect to antenna ports 9 to 14, a UE assumes that $n_{SCID}$ is 0.

The URS supports PDSCH transmission and is transmitted in antenna ports p=5, p=7, p=8 or p=7, 8, ..., v+6. Here, v is a number of layers used for transmission of a PDSCH.

URSs may be transmitted to a single UE through antenna ports included in an aggregation S. S may be {7,8,11,13} or {9,10,12,14}.

With respect to the antenna ports p=7, p=8, p=7, 8, ..., v+6, physical resource blocks having a frequency region index $n_{PRB}$ are allocated for PDSCH transmission. A portion of a URS sequence r(m) is mapped to a complex value modulation symbol $a^{(p)}_{k,l}$ as expressed by Equation 6.

[Equation 6]

$$a^{(p)}_{k,l} = w_p(l') \cdot r(3 \cdot l' \cdot N_{RB}^{max,DL} + 3 \cdot n_{PRB} + m')$$

where $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8} \\ l' \bmod 2 + 2 + 3\lfloor l'/2 \rfloor & \text{if in a special subframe with configuration 1, 2, 6, or 7} \\ l' \bmod 2 + 5 & \text{if not in a special subframe} \end{cases}$$

-continued $$l' = \begin{cases} 0, 1, 2, 3 & \text{if } n_s \bmod 2 = 0 \text{ and in a special subframe} \\ & \text{with configuration 1, 2, 6, or 7} \\ 0, 1 & \text{if } n_s \bmod 2 = 0 \text{ and not in special subframe} \\ & \text{with configuration 1, 2, 6, or 7} \\ 2, 3 & \text{if } n_s \bmod 2 = 1 \text{ and not in special subframe} \\ & \text{with configuration 1, 2, 6, or 7} \end{cases}$$

$$m' = 0, 1, 2$$

Sequence $\overline{w}_p(i)$ is given in a normal CP as shown in Table 5.

TABLE 5

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Namely, a configuration of a URS is determined by a cell ID, a scrambling ID, an antenna port, and the like.

Figure 4:
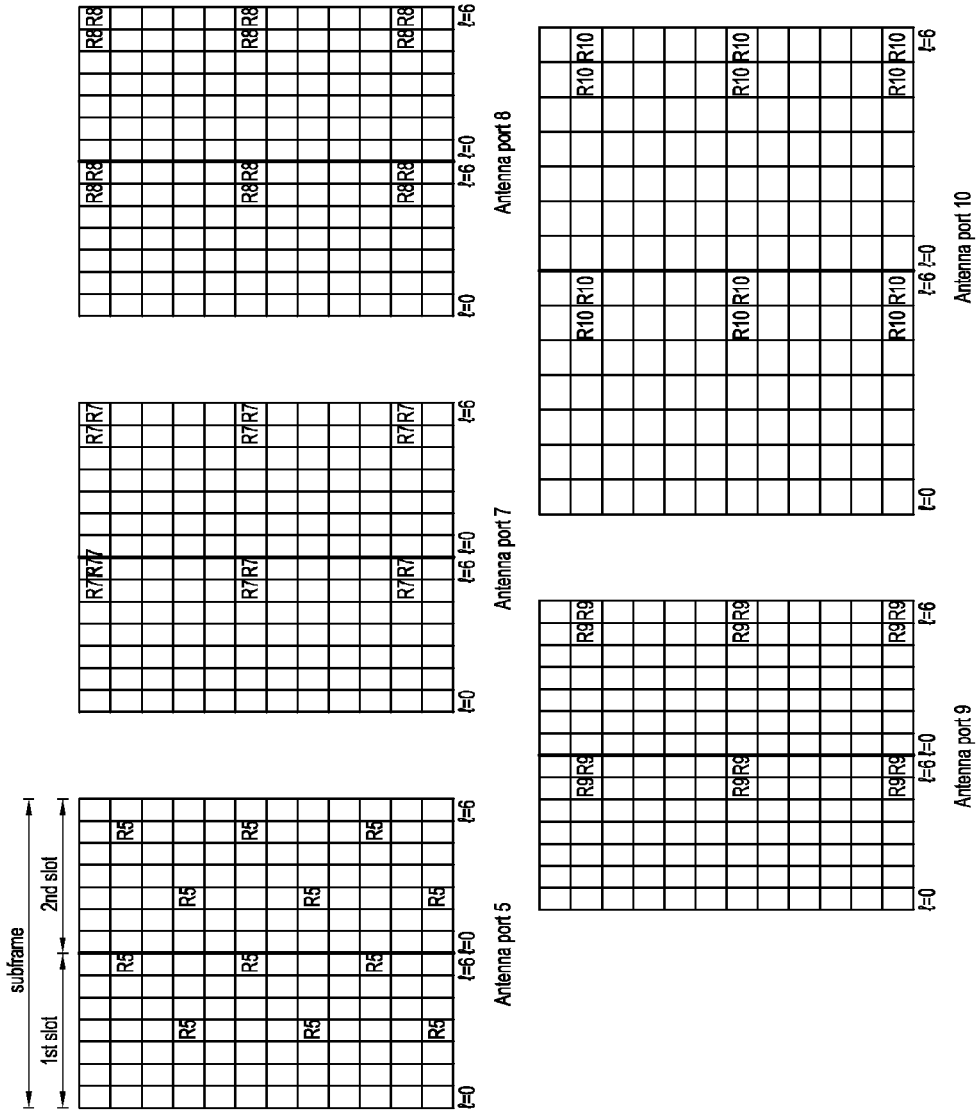
FIG. 4 is a view illustrating an example of RBs to which URS are mapped in which DM-RS is used as an example of a URS.

FIG. 4 is a view illustrating an example of an RB to which a URS is mapped. A DM-RS is taken as an example of a URS.

FIG. 4 illustrates resource elements used for a DM-RS in a normal CP structure. Rp is a resource element used for DM-RS transmission in an antenna port p. For example, R5 indicates a resource element in which a DM-RS with respect to an antenna port 5 is transmitted. Also, referring to FIG. 4, DM-RSs with respect to antenna ports 7 and 8 are transmitted through resource elements corresponding to first, sixth, and eleventh subcarriers (subcarrier indices 0, 5, 10) of sixth and seventh OFDM symbols (OFDM symbol indices 5, 6) of each slot. The DM-RSs with respect to the antenna ports 7 and 8 may be identified by an orthogonal sequence having a length 2. DM-RSs with respect to antenna ports 9 and 10 are transmitted through resource elements corresponding to second, seventh, and twelfth subcarriers (subcarrier indices 1, 6, 11) of sixth and seventh OFDM symbols (OFDM symbol indices 5, 6) of sixth and seventh OFDM symbols of each slot. DM-RSs with respect to the antenna ports 9 and 10 may be identified by an orthogonal sequence having a length 2. Also, since S={7,8,11,13} or S={9,10,12,14}, DM-RSs with respect to the antenna ports 11 and 13 are mapped to resource elements to which the DM-RSs with respect to the antenna ports 7 and 8 are mapped, and DM-RSs with respect to the antenna ports 12 and 14 are mapped to resource elements to which the DM-RSs with respect to the antenna ports 9 and 10 are mapped.

Meanwhile, in a system of 3GPP Rel 11 or higher, an introduction of a multi-node system as illustrated in FIG. 1 having multiple connection nodes within a cell has been determined to improve performance. Also, standardization is in progress to apply various MIMO schemes and cooperative communication schemes that are under development or that may be applicable in the future to a multi-node environment.

Due to the introduction of nodes, a new control channel to apply various cooperative communication schemes to a multi-node environment is requested to be introduced. An enhanced-PDCCH (E-PDCCH) is a control channel discussed to be newly introduced due to the need.

Figure 5:
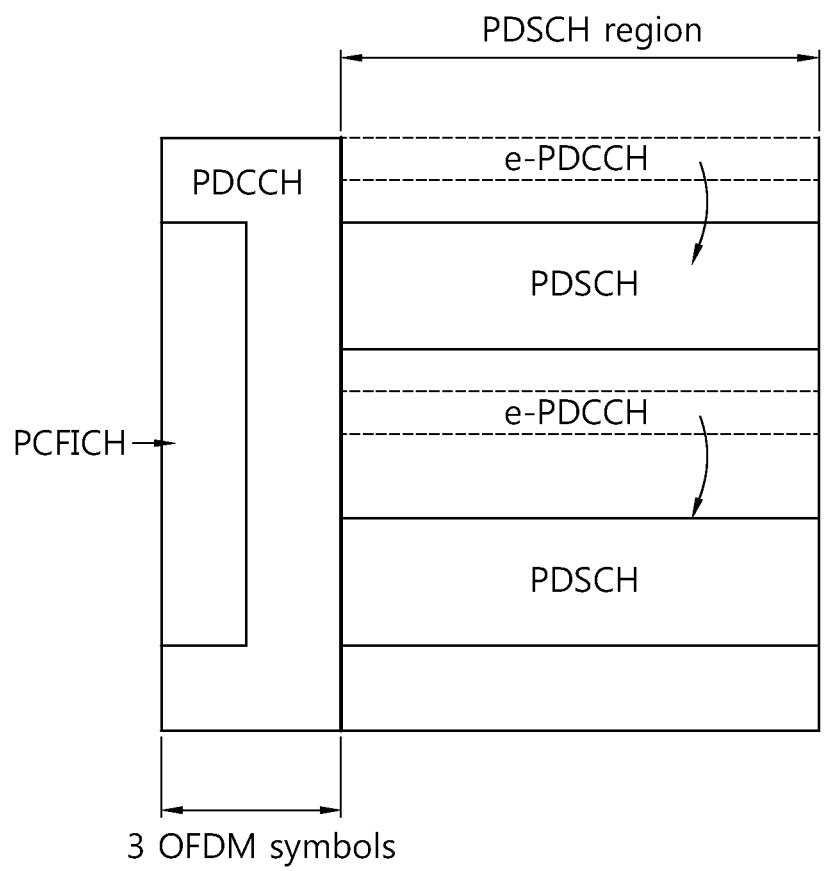
FIG. 5 is a view illustrating an example of an E-PDCCH.

FIG. 5 illustrates an example of an E-PDCCH.

An allocation position of the E-PDCCH may be within a data region (PDSCH region), rather than in an existing control region (PDCCH region). Control information with respect to nodes for each UE may be transmitted through the E-PDCCH, solving the problem of shortage of the existing PDCCH region.

The E-PDCCH may not be provided to UEs operating based on existing 3GPP Rel 8-10 and may be searched by UEs operating based on 3GPP Rel 11 or higher and a portion of the PDSCH region is allocated to use the E-PDCCH. For example, the E-PDCCH may be used by defining a portion of the PDSCH region in which data is generally transmitted as illustrated in FIG. 5. A UE may perform blind decoding in order to detect presence and absence of its E-PDCCH. The E-PDCCH may perform a scheduling operation identical to that of the existing PDCCH, namely, a PDSCH or PUSCH scheduling operation.

In a specific allocation scheme of the E-PDCCH, an existing R-PDCCH structure may be re-used. This is to minimize impact generated in case of altering the existing standard.

Figure 6:
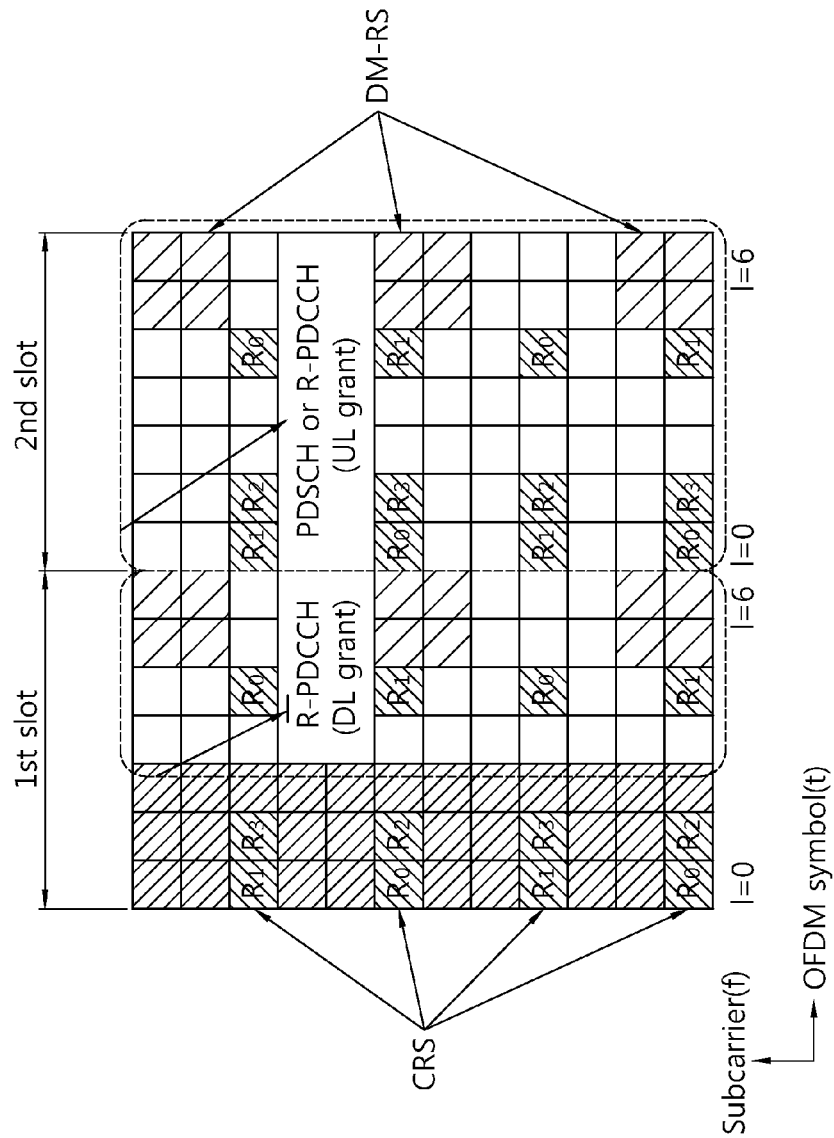
FIG. 6 is a view illustrating an example of an existing R-PDCCH.

FIG. 6 is a view illustrating an existing R-PDCCH.

In a frequency division duplex (FDD) system, only DL grant may be allocated to a first slot of a resource block and UL grant or data (PDSCH) may be allocated to a second slot of the resource block. In this case, R-PDCCH is allocated to data RE excluding all of the PDCCH region, a CRS, and a URS. For R-PDCCH demodulation, both a URS and a CRS may be used as illustrated in Table 5.

In case of using a URS, the antenna port 7 and scrambling ID=0 are used. Meanwhile, in case of using a CRS, the antenna port 0 may be used only when only a single PBCH transmission antenna is provided, and in a case in which two or four PBCH transmission antennas are provided, a mode is changed to a transmission diversity mode and both antenna ports {0 to 1} and {0 to 3} may be used.

TABLE 6

| Transmission mode | DCI format | Transmission scheme of PDSCH corresponding to R-PDCCH |
|---|---|---|
| Mode 8 | DCI format 1A | In a case that R-PDCCH is demodulated based on URS: Single antenna port: Antenna port 7 and $n_{SCID} = 0$ is used. In a case that R-PDCCH is demodulated based on CRS: If a single PBCH antenna port is provided, a single antenna port, namely, antenna port 0, is used. Otherwise, a transmit diversity is used. |
|  | DCI format 2B | Dual-layer transmission by antenna ports 7 and 8; or a single antenna port by antenna port 7 or 8 |
| Mode 9 | DCI format 1A | In a case that R-PDCCH is demodulated based on URS: Single antenna port: Antenna port 7 and $n_{SCID} = 0$ is used. In a case that R-PDCCH is demodulated based on CRS: If a single PBCH antenna port is provided, a single antenna port, namely, antenna port 0, is used. Otherwise, a transmit diversity is used. |
|  | DCI format 2C | Up to 4 layer transmission: antenna ports 7 to 10 |

<Operation Method of E-PDCCH>

Figure 7:
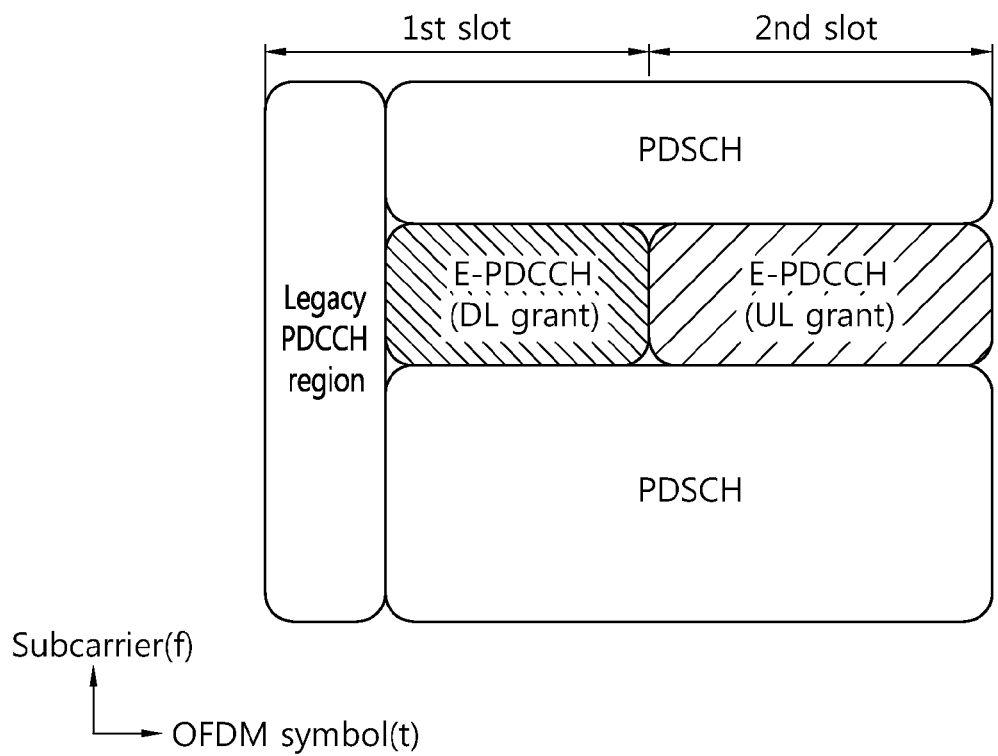
FIG. 7 is a view illustrating an example of separately allocating DL grant and a UL grant by slots.

FIG. 7 is a view illustrating an example of separately allocating DL grant and a UL grant by slots. It is assumed that an E-PDCCH is configured in both a first slot and a second slot of a subframe.

Referring to FIG. 7, DL grant is allocated to a first slot of a subframe, and UL grant is allocated to a second slot of the subframe.

The DL grant refers to DCI formats for transmitting DL control information of a UE, for example, DCI formats 1, 1A, 1B, 1C, 1D, 2, 2A, and the like. The UL grant refers to DCI formats including control information related to uplink transmission of a UE, for example, DCI formats 0 and 4.

The DL grant and the UL grant to be searched are divided by slots in a subframe. Thus, a UE configures a search space in the first slot and performs blind decoding for searching DL grant, and performs blind decoding for searching the UL grant in the configured search space in the second slot.

In LTE, downlink transmission modes 1 to 9 and uplink transmission modes 1 and 2 exist. A single transmission mode is set for each UE through higher layer signaling. In the downlink transmission modes, two DCI formats to be searched by each UE exist for each set mode. Meanwhile, in uplink transmission modes, one or two DCI formats are to be searched by each UE for each set mode. For example, in uplink transmission mode 1, the DCI format 0 corresponds to UL grant, and in uplink transmission mode 2, DCI formats 0 and 4 correspond to UL grant.

In case of FIG. 7, the number of times of blind decoding to be performed by a UE to detect its E-PDCCH in a search space configured for each slot is as follows.

DL grant: (number of PDCCH candidates)×(number of DCI formats with respect to DL transmission modes)=16×2=32

UL grant: (number of PDCCH candidates in UL transmission mode 1)×(number of DCI formats in UL transmission mode 1)=16×1=16 or (number of PDCCH candidates in UL transmission mode 2)×(number of DCI formats in UL transmission mode 2)=16×2=32

Thus, total number of times of blind decoding obtained by adding the number of times of blind decoding in the first slot and the number of times of blind decoding in the second slot is 32+16=48 in the uplink transmission mode 1 and 32+32=64 in the uplink transmission mode 2.

Figure 8:
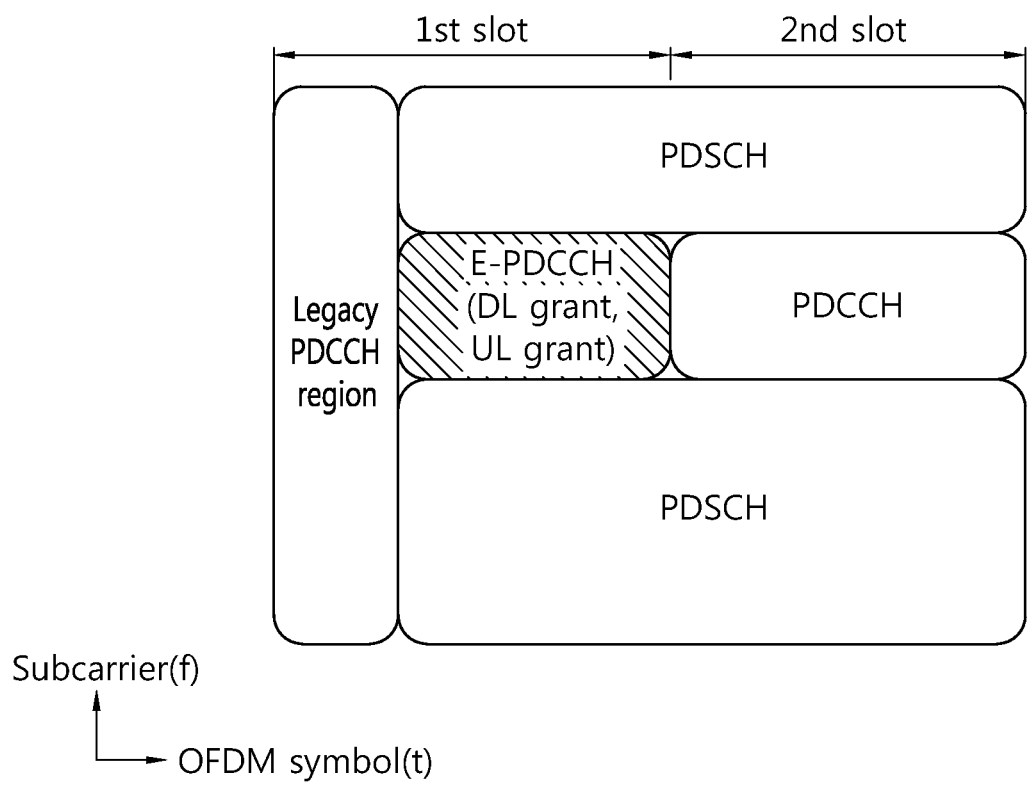
FIG. 8 is a view illustrating an example of simultaneously allocating a DL grant and UL grant to a first slot.

FIG. 8 is a view illustrating an example of simultaneously allocating a DL grant and UL grant to a first slot. It is assumed that an E-PDCCH is configured only in a first slot of a subframe.

Referring to FIG. 8, in case of allocating an E-PDCCH, both DL grant and UL grant may be simultaneously allocated to a first slot of a subframe. Thus, both the DL grant and the UL grant exist in the E-PDCCH of the first slot. A UE performs blind decoding to detect DL grant and UL grant only in the first slot of the subframe.

In LTE, DCI formats to be detected according to a transmission mode set for each U are determined. In particular, a total of 2 DCI formats may be detected in each DL transmission mode, and every DL transmission mode basically includes a DCI format 1A to support a fall-back mode.

In the UL grant, a DCI format 0 has a length identical to that of a DCI format 1A and may be discriminated by a 1-bit flag. Thus, additional blind decoding is not performed. However, in case of a DCI format 4, one of the remaining formats of the UL grant, additional blind decoding needs to be performed.

In FIG. 8, a number of times of blind decoding to be performed for a UE to search for its E-PDCCH in a search space is as follows.

In case of DL grant: (number of PDCCH candidates)×(number of DCI formats with respect to each DL transmission mode)=16×2=32

UL grant: (number of PDCCH candidates in UL transmission mode 1)×(number of DCI formats in UL transmission mode)=0 or (number of PDCCH candidates in UL transmission mode 2)×(number of DCI formats in UL transmission mode 2)=16×1=16

Thus, a total number of times of blinding decoding is 32+0=32 in UL transmission mode 1 and 32+16=48 in UL transmission mode.

<Cross Interleaving of E-PDCCH>

Similar to R-PDCCH, cross-interleaving (hereinafter, referred to as 'interleaving') may also be applied to the E-PDCCH. In a state in which a common PRB aggregation common to a plurality of UEs is set, E-PDCCHs of the plurality of UEs may be interleaved in frequency domain or time domain.

Figure 9:
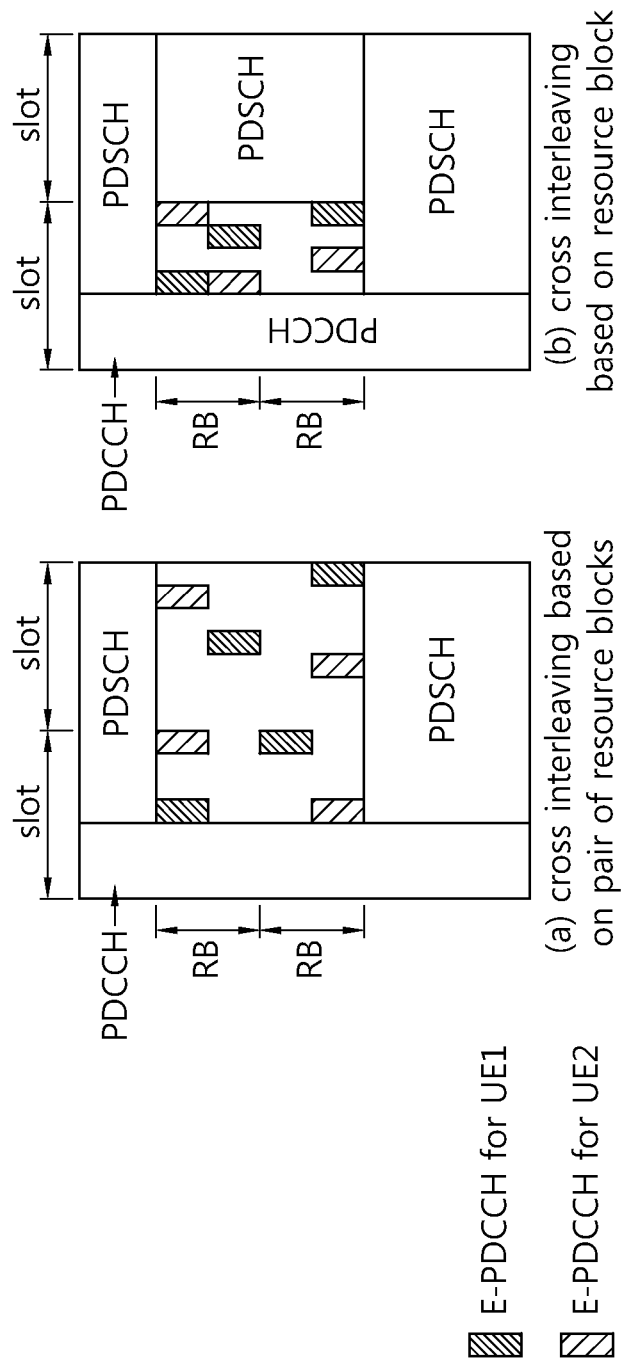
FIG. 9 is a view illustrating examples of interleaving E-PDCCH.

FIG. 9 is a view illustrating examples of interleaving E-PDCCH.

FIG. 9(a) is a view illustrating an example of performing cross interleaving based on a pair of resource blocks, and FIG. 9(b) illustrates an example of performing cross interleaving based on resource blocks.

As illustrated in FIG. 9, a plurality of E-PDCCHs with respect to a plurality of UEs may be distributedly allocated in a time domain and a frequency domain. When the cross interleaving is used, frequency/time diversity may be obtained in a plurality of resource blocks, obtaining a diversity gain.

Unlike a CRS-based PDCCH, a URS-based PDCCH (namely, the foregoing PDCCH) may be decoded through a URS generated based on different antenna ports and sequences for each UE.

Meanwhile, an E-PDCCH may be mapped to radio resource such that it is cross-interleaved or may be mapped to radio resource such that it is not cross-interleaved. The non-interleaving is a scheme in which radio resource is locally allocated, and the cross interleaving may be a scheme in which radio resource is distributedly allocated. Hereinafter, a region in which the cross-interleaved E-PDCCH is not allocated will be referred to as an interleaving region and a region in which the non-interleaved E-PDCCH is allocated will be referred to as a non-interleaving region.

The interleaving region and non-interleaving region may be determined by using a physical resource block (PRB), a virtual resource block (VRB), or a slot as an allocation unit. The VRB has a size identical to that of the PRB and is discriminated by a logical index. Alternatively, each of the interleaving region and the non-interleaving region may be determined by using a resource block obtained by dividing the PRB and the VRB, as an allocation unit. Namely, a new allocation unit different from that of an existing resource block may be used.

In the non-interleaving region, an allocation unit may be used according to an aggregation level of an E-PDCCH. For example, when an allocation unit in the non-interleaving region is a slot, an aggregation level {1, 2, 4, 8} may mean that an E-PDCCH may be composed of 1, 2, 4, or 8 slots.

Similarly, when an allocation unit is a partial resource block obtained by dividing a resource block into N parts, an aggregation level of an E-PDCCH indicates a number of partial resources that may constitute an E-PDCCH. When an aggregation level is {1, 2, 4, 8}, the E-PDCCH may be composed of 1, 2, 4, or 8 partial resource blocks. Here, for example, N may be 4. In this case, when the aggregation level is greater than 4, one more resource block may be used.

In the case in which an E-PDCCH is allocated by using partial resource blocks obtained by dividing a resource block into N parts, as a unit, an aggregation level may be determined as a different aggregation rather than {1, 2, 4, 8}. For example, in case of N=4, an aggregation level may be defined as {1, 2, 4} or {1, 2, 3, 4}. In this manner, the aggregation level may be redefined to provide every aggregation level in a single resource block.

In the interleaving region, the smallest aggregation level of an E-PDCCH may be composed of a minimum of two resource blocks, slots, or the foregoing partial resource blocks.

Hereinafter, a method for configuring a search space in an E-PDCCH and a method for searching for an E-PDCCH by a UE will be described.

An E-PDCCH is a control channel transmitted in a PDSCH region as described above. A resource region in which an E-PDCCH is transmitted will be referred to as an E-PDCCH region. The E-PDCCH region may be divided into a region in which cross-interleaving is applied (hereinafter, referred to as an 'interleaving region') and a region in which cross-interleaving is not applied (hereinafter, referred to as a 'non-interleaving region').

Hereinafter, for the purposes of description, a CSS and a USS in an existing PDCCH region will be referred to as a first CSS and a first USS.

Figure 10:
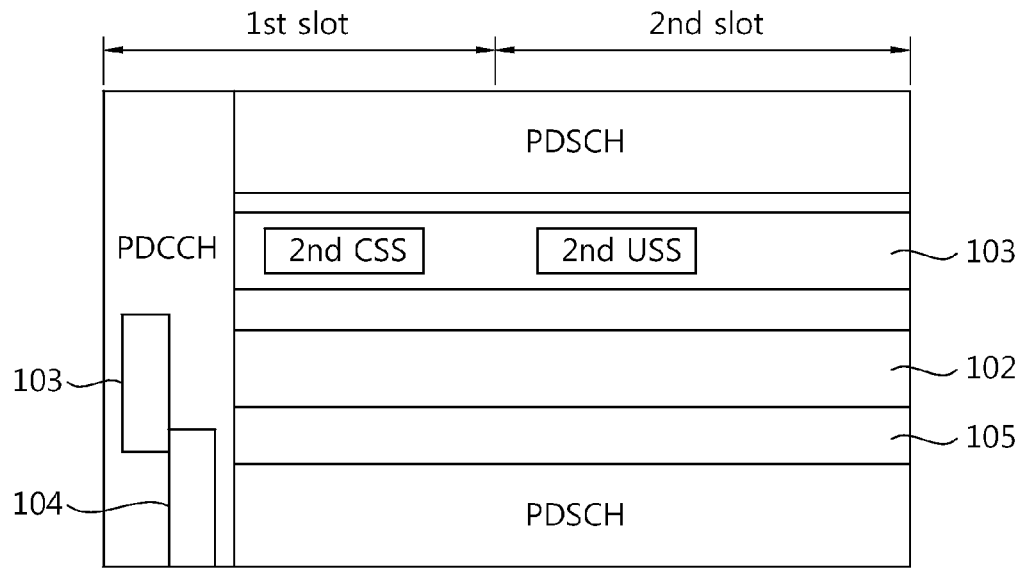
FIG. 10 is a view illustrating a method of configuring a search space according to an embodiment of the present invention.

FIG. 10 is a view illustrating a method of configuring a search space according to an embodiment of the present invention.

Referring to FIG. 10, an E-DCCH region 105 may include an interleaving region 101 and a non-interleaving region 102 distinguished in a frequency domain.

The interleaving region 101 may be used as a resource region in which E-PDCCHs for a UE or a plurality of UEs whose channel state is frequently changed, like a UE that moves at a high speed, are transmitted. The non-interleaving region 102 may be used as a resource region in which an E-PDCCH for a UE whose channel state is not frequently changed, like a UE that moves at a low speed, is transmitted.

Both a second CSS and a second USS may be configured in the interleaving region 101. In this case, all the E-PDCCHs allocated to the interleaving region 101 may be decoded by using a URS.

If an independent USS is configured in each node in the multi-node system, node-specific information may be transmitted in the second CSS using the same URS. For example, an E-PDCCH CRC scrambled with an RN-RNTI, a TPC-PUCCH-RNTI, or a TPC-PUSCH-RNTI may be transmitted in the second CSS of the interleaving region 101.

In FIG. 10, the interleaving region 101 and the non-interleaving region 102 are set to be distinguished in the frequency domain, but the present invention is not limited thereto. Namely, the interleaving region and the non-interleaving region may be set to be distinguished in a time domain. For example, by slots, an interleaving region may be set within a single slot and a non-interleaving region may be set in another slot. Also, the interleaving region and the non-interleaving region may be set to be distinguished from each other in time and frequency domains.

Figure 11:
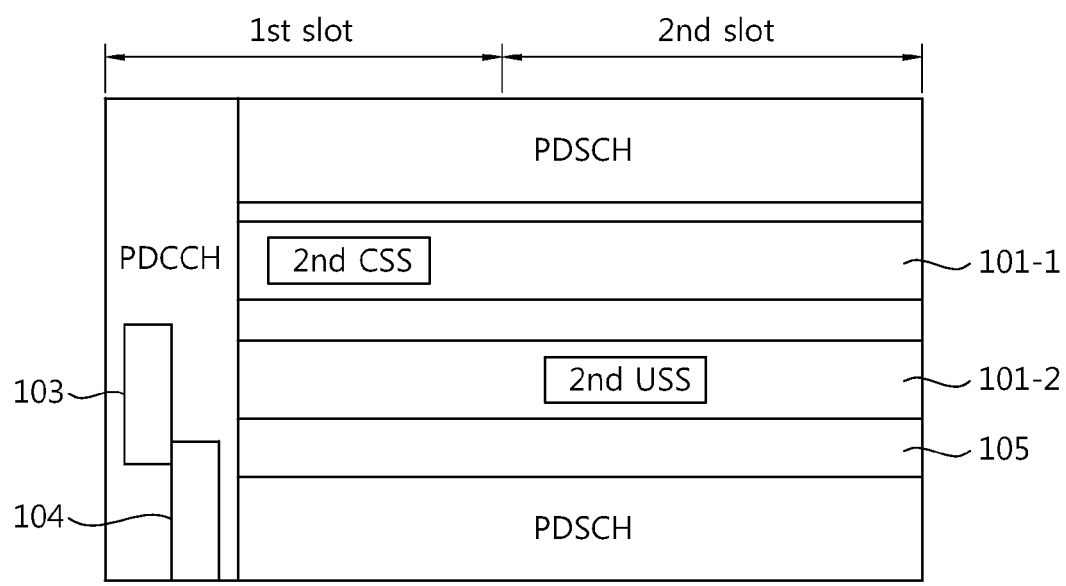
FIG. 11 is a view illustrating a method of configuring a search space according to another embodiment of the present invention.

FIG. 11 is a view illustrating a method of configuring a search space according to another embodiment of the present invention.

Referring to FIG. 11, an E-PDCCH region 105 may include a plurality of interleaving regions which are distinguished from each other. For example, the E-PDCCH region 105 may include a first interleaving region 101-1 and a second interleaving region 101-2 distinguished in the frequency domain. However, this is merely illustrative and the first interleaving region 101-1 and the second interleaving region 101-2 may be allocated to resource distinguished in the time domain or may be allocated to resources distinguished in both time and frequency domains.

A second CSS may be configured in the first interleaving region 101-1, and a second USS may be configured in the second interleaving region 101-2.

In this manner, when the second CSS and the second USS are distributedly configured in the distinguished interleaving regions, the second CSS and the second USS may be decoded by using different URSs. Namely, different URSs may be transmitted in the second CSS and the second USS and the second CSS and the second USS may be decoded by different URSs.

FIG. 11 is merely illustrative. Namely, unlike the case of FIG. 11, the second CSS may be configured in the interleaving region and the second USS may be configured in the non-interleaving region. In this case, although the second USS is independently configured in each node, the second CSS may be configured to be cell-specific. In other words, the second CSS may be commonly configured for every node within a cell. Then, a reference signal sequence of a URS used to demodulate an E-PDCCH transmitted through the second CSS may be generated by a physical cell identifier (PCI) of a cell, and a reference signal sequence of a URS used to demodulate an E-PDCCH transmitted through the second USS may be generated by a cell ID and/or a scrambling ID different from the PCI.

A UE is mobile, and a node adjacent to a UE may be changed as the UE is moved. Then, a BS may change the node with which the UE has communicated. The second USS is configured to be node-specific, so the BS may need to provide information regarding a resource block of the second USS, a change in a URS, and the like, through RRC signaling.

In this case, when the second CSS and the second USS are configured together within a single interleaving region as illustrated in FIG. 10, a resource block of the second CSS as well as that of the second USS, a URS, and the like, need to be changed. Thus, in order to operate the UE in a fallback mode, a DCI should be transmitted in the first CSS of the existing PDCCH. Namely, the UE needs to search an E-PDCCH, as well as an existing PDCCH. The operation of searching for both the existing PDCCH and the E-PDCCH consumes a great amount of power, relative to an operation of searching for only the E-PDCCH, and increases a process delay of a PDSCH.

In contrast, when the second CSS and the second USS are distinguishably configured in the E-PDCCH region as illustrated in FIG. 11, in order to operate the UE in the fallback mode until when a reconfiguration according to RRC signaling is completed, a DCI format 1A may be transmitted in the first CSS to support a data service.

<Search for DCI Format for Fallback Mode within E-PDCCH Region>

A UE operating based on the existing LTE-A Release 10 searches for two DCI formats with respect to a single transmission mode. Both transmission modes support DCI format 1A for the fallback mode. Namely, the DCI format 1A is supported regardless of a transmission mode. For example, a UE for which a transmission mode 9 is set searches DCI format 2C from a USS of a PDCCH region and DCI format 1A from a CSS and USS of a PDCCH region. This has been described above with reference to Table 1.

When the fallback mode is supported in this manner, transmission may be performed by the DCI format 1A in a state in which information required for providing a main DCI format (a DCI format excluding the DCI format 1A to be searched according to a transmission mode) is damaged or has low reliability, and thus, a minimum data service may be stably provided. The DCI format 1A may also be searched from a CCS, as well as from a USS of a PDCCH region.

However, when the E-PDCCH region is introduced and a UE is configured to search for a DCI format only with the E-PDCCH region, where a fallback mode is to be searched needs to be newly defined. Hereinafter, it is assumed that a UE is configured to search for a DCI format only within an E-PDCCH region by a BS. Also, it may be a case in which the second CSS is configured in the interleaving region constituting the E-PDCCH region and the second USS is configured in the non-interleaving region. Alternatively, the second CSS and the second USS may be configured in the interleaving region constituting the E-PDCCH and a third USS may be configured in the non-interleaving region. A DCI format supported together with the DCI format 1A in a transmission mode X will be referred to as a DCI format X.

Figure 12:
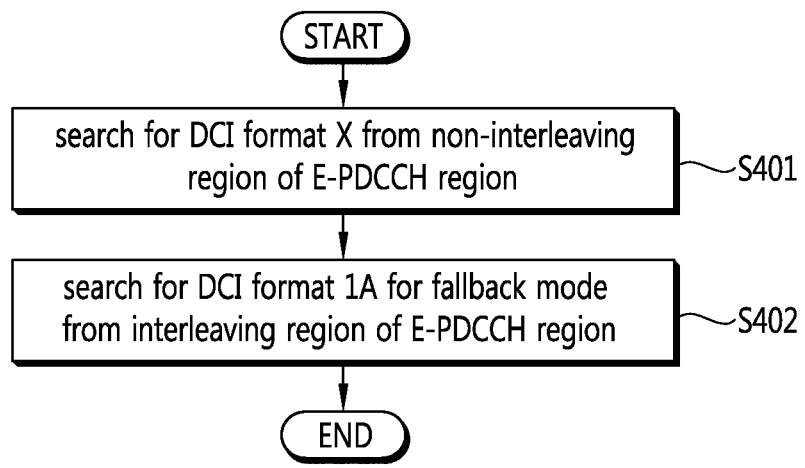
FIG. 12 is a view illustrating a method of searching for a DCI by a user equipment (UE) according to an embodiment of the present invention.

FIG. 12 is a view illustrating a method of searching for a DCI by a UE according to an embodiment of the present invention.

Referring to FIG. 12, the UE may search for a DCI format X in the non-interleaving region of the E-PDCCH region (S401). The DCI format X is searched from the search space included in the non-interleaving region. The UE may search for the DCI format 1A for a fallback mode from the interleaving region (S402). Namely, the UE searches for the DCI format 1A from a search space included in the interleaving region.

In FIG. 12, an example in which the UE searches for the DCI format 1A for the fallback mode only from the interleaving region is illustrated, but the present invention is not limited thereto. Namely, the UE may search the DCI format 1A from both the interleaving region and the non-interleaving region of the E-PDCCH region.

The BS or a node transmits the DCI format 1A in the interleaving region to support the fallback mode in which data may be transmitted by applying a transmit diversity scheme in a situation in which feedback information for supporting precoding or beamforming is damaged or has low reliability. The DCI format 1A may be transmitted in the non-interleaving region when a node is changed due to failure of a node providing a data service, or the like, or when a DCI format 0 is searched.

Figure 13:
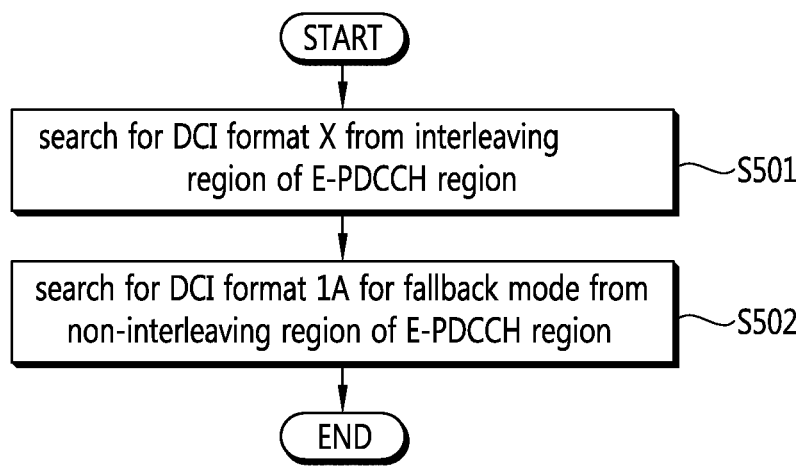
FIG. 13 is a view illustrating a method of searching for a DCI by a UE according to another embodiment of the present invention.

FIG. 13 is a view illustrating a method of searching for a DCI by a UE according to another embodiment of the present invention.

Referring to FIG. 13, the UE may search for the DCI format X in the interleaving region (S501). Namely, the UE searches for the DCI format X from a search space included in the interleaving region. Also, the UE may search the DCI format 1A for the fallback mode from the non-interleaving region (S502). Namely, the UE searches for the DCI format 1A from a search space included in the non-interleaving region.

In FIG. 13, the example in which the DCI format 1A for the fallback mode is searched only from the non-interleaving region, but the present invention is not limited thereto. Namely, the UE may search for the DCI format 1A from both the interleaving region and the non-interleaving region.

In a case in which an adjacent node needs to be changed due to a movement of a UE, the BS should change in the node through RRC signaling. During the RRC signaling process, the fallback mode is supported in order to continue a data service. In this case, in which of E-PDCCH regions a DCI format for the fallback mode is to be searched is problematic.

For example, it is assumed that a configuration of a serving node is changed such that a UE, which has been served by a node 1, is subsequently served by a node 2 due to a movement thereof.

In order to change the serving node, the UE needs to perform a process of receiving an RRC reconfiguration message and transmitting a reconfiguration complete message, which takes a time, and during the serving node changing process, it is necessary for the UE to operate in the fallback mode.

In a case in which a UE is set to search for the DCI format X in any one of the interleaving region and the non-interleaving region, the DCI format 1A for supporting the fallback mode may be set to be searched from the other region. In a case in which the UE does not detect the DCI format X or there is a problem in reliability, a fallback mode transmission by the DCI format 1A will be used, so it is necessary to increase probability of detecting the DCI format 1A. Thus, the DCI format X and the DCI format 1A may be separately allocated to radio resource regions (namely, the interleaving region or the non-interleaving region) having different characteristics.

Or, in a case in which a UE is set to search for the DCI format X from any one of the interleaving region and the non-interleaving region, the DCI format 1A for supporting the fallback mode may be set to be searched from both of the two regions. This is because, since the DCI format 1A is not necessarily used only for the fallback mode transmission, it may also be allocated to a radio resource region identical to that of the DCI format X.

In an application example of the present invention, when a UE is set to search for the DCI format X by using a URS based on {antenna port 7, scrambling ID=0, cell ID=1} with respect to node 1 in the interleaving region, a node 2 may provide the DCI format 1A based on a URS generated by {antenna port 7, scrambling ID=0, and cell ID=1} in the non-interleaving region.

Or, when a UE is set to search for the DCI format X by using a URS based on {antenna port 7, scrambling ID=0, cell ID=1} with respect to node 1 in the non-interleaving region, a node 2 may provide the DCI format 1A based on a URS generated by {antenna port 7, scrambling ID=0, and cell ID=1} in the interleaving region.

Figure 14:
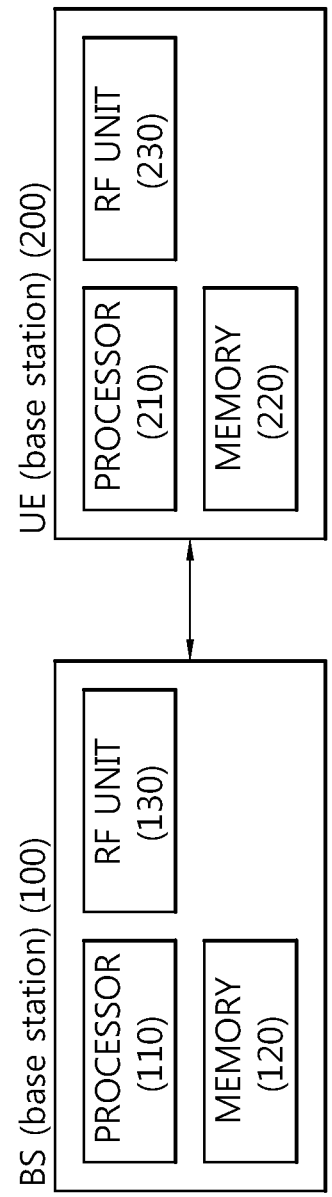
FIG. 14 is a block diagram illustrating a wireless device to which an embodiment of the present invention is applicable.

FIG. 14 is a block diagram illustrating a wireless device to which an embodiment of the present invention is applicable.

A BS 100 includes a processor 110, a memory 120, and a radio frequency (RF) unit 130. The processor 110 implements a proposed function and/or method. Layers of a radio interface protocol are implemented by the processor 110. The memory 120 is connected to the processor 110 and stores various types of information for driving the processor 110. The RF unit 130 is connected to the processor 110 and transmits and/or receives a radio signal.

A UE 200 includes a processor 210, a memory 220, and a radio frequency (RF) unit 230. The processor 210 implements a proposed function and/or method. Layers of a radio interface protocol may be implemented by the processor 210. The memory 220 is connected to the processor 210 and stores various types of information for driving the processor 210. The RF unit 230 is connected to the processor 210 and transmits and/or receives a radio signal.

The processors 110 and 210 includes may include an ASIC (Application-Specific Integrated Circuit), a chip set, a logical circuit, and/or a data processing device. The memories 120 and 220 may include a ROM (Read-Only Memory), a RAM (Random Access Memory), a flash memory, a memory card, a storage medium, and/or any other storage device. The RF units 130 and 230 may include a baseband circuit for processing a radio signal. When the embodiment is implemented by software, the foregoing techniques may be implemented as modules (processes, functions, and the like) performing the foregoing functions. The modules may be stored in the memories 120 and 220 and executed by the processors 110 and 210. The memories 120 and 220 may be provided within or outside the processors 110 and 120 and may be connected to the processors 110 and 210 through a well-known unit.

What is claimed is:

1. A method for searching for a control channel by a user equipment (UE) in a multi-node system, the method comprising:
    searching for first downlink control information (DCI) determined according to a transmission mode in an enhanced-physical downlink control channel (E-PDCCH); and
    searching for second DCI in the E-PDCCH regardless of the transmission mode,
    wherein an E-PDCCH region is a control channel region in which DCI is decoded based on a UE-specific reference signal (URS) in a subframe including a plurality of orthogonal frequency division multiplexing (OFDM) symbols is transmitted,
    wherein the E-PDCCH region includes a non-interleaving region comprised of a local radio resource and an interleaving region comprised of distributed radio resources,
    wherein the second DCI is searched from only the interleaving region or from both of the non-interleaving region and the interleaving region, when the first DCI is searched from the non-interleaving region,
    wherein the second DCI is searched from only the non-interleaving region or from both of the non-interleaving region and the interleaving region when the first DCI is searched from the interleaving region, and
    wherein the second DCI is a DCI format 1A used for a fallback mode that provides a minimum data service when the UE is damaged or has low reliability.

2. The method of claim 1, wherein the interleaving region includes a common search space (CSS) from which a plurality of UEs including the UE search for DCI and a UE-specific search space (USS) from which the UE-specific DCI is searched.

3. The method of claim 1, wherein the interleaving region includes a common search space (CSS) from which a plurality of UEs including the UE search for DCI and the non-interleaving region includes a UE-specific search space (USS) from which the UE-specific DCI is searched.

4. The method of claim 1, wherein when the UE changes a serving node from a first node to a second node, the first DCI is attempted to be received from the first node and the second DCI is attempted to be received from the second node.

5. A user equipment (UE) searching for a control channel in a multi-node system, the user equipment comprising:
    a radio frequency (RF) unit configured to transmit and receive a wireless signal; and
    a processor connected to the RF unit,
    wherein the processor is configured for:
    searching for first downlink control information (DCI) determined according to a transmission mode in an enhanced-physical downlink control channel (E-PDCCH); and
    searching for second DCI in the E-PDCCH regardless of the transmission mode,
    wherein an E-PDCCH region is a control channel region in which DCI is decoded based on a UE-specific reference signal (URS) in a subframe including a plurality of orthogonal frequency division multiplexing (OFDM) symbols is transmitted,
    wherein the E-PDCCH region includes a non-interleaving region comprised of a local radio resource and an interleaving region comprised of distributed radio resources,
    wherein the second DCI is searched from only the interleaving region or from both of the non-interleaving region and the interleaving region, when the first DCI is searched from the non-interleaving region,
    wherein the second DCI is searched from only the non-interleaving region or from both of the non-interleaving region and the interleaving region when the first DCI is searched from the interleaving region, and
    wherein the second DCI is a DCI format 1A used for a fallback mode that provides a minimum data service when the UE is damaged or has low reliability.

6. The user equipment of claim 5, wherein the interleaving region includes a common search space (CSS) from which a plurality of UEs including the UE search for DCI and a UE-specific search space (USS) from which the UE-specific DCI is searched.

7. The user equipment of claim 5, wherein the interleaving region includes a CSS from which a plurality of UEs including the UE search for DCI and the non-interleaving region includes a USS from which the UE-specific DCI is searched.

8. The user equipment of claim 5, wherein when the UE changes a serving node from a first node to a second node, the first DCI is attempted to be received from the first node and the second DCI is attempted to be received from the second node.

* * * * *